(12) United States Patent
Kadobayashi et al.

(10) Patent No.: US 12,097,944 B2
(45) Date of Patent: Sep. 24, 2024

(54) MARINE PROPULSION DEVICE

(71) Applicant: YAMAHA HATSUDOKI KABUSHIKI KAISHA, Iwata (JP)

(72) Inventors: Yoshiyuki Kadobayashi, Shizuoka (JP); Akihiro Noma, Shizuoka (JP); Koki Takimoto, Shizuoka (JP); Ryosuke Hara, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 437 days.

(21) Appl. No.: 17/680,592

(22) Filed: Feb. 25, 2022

(65) Prior Publication Data

US 2022/0315190 A1 Oct. 6, 2022

(30) Foreign Application Priority Data

Mar. 31, 2021 (JP) .................. 2021-059378

(51) Int. Cl.
*B63H 20/14* (2006.01)
*B63H 23/30* (2006.01)
*B63H 23/34* (2006.01)
*F16H 57/04* (2010.01)

(52) U.S. Cl.
CPC ............. *B63H 20/14* (2013.01); *B63H 23/30* (2013.01); *B63H 23/34* (2013.01); *F16H 57/0427* (2013.01); *F16H 57/0494* (2013.01)

(58) Field of Classification Search
CPC ........ B63H 20/14; B63H 23/30; B63H 23/34; F16H 57/0427; F16H 57/0494
See application file for complete search history.

(56) References Cited

U.S. PATENT DOCUMENTS

| | | | |
|---|---|---|---|
| 2008/0009207 A1* | 1/2008 | Okabe | B63H 20/002 440/88 L |
| 2010/0240267 A1* | 9/2010 | Fukuoka | B63H 21/383 440/88 L |
| 2013/0052891 A1 | 2/2013 | Yoshigasaki et al. | |
| 2017/0113772 A1* | 4/2017 | Kumita | B63H 20/002 |

FOREIGN PATENT DOCUMENTS

JP 2013-049372 A 3/2013

* cited by examiner

*Primary Examiner* — Stephen P Avila
(74) *Attorney, Agent, or Firm* — Keating & Bennett, LLP

(57) ABSTRACT

A marine propulsion device includes a first gear, a second gear, a third gear, a case, a partition wall, and a first flow path. The case includes an internal space in which the first gear, the second gear, and the third gear are located. The partition wall is located between the second gear and the third gear in the internal space. The partition wall partitions the internal space into a first space and a second space. The second gear is located in the first space. The third gear is located in the second space. The first flow path communicates the first space with the second space. The first flow path is located on a same side as the first gear with respect to a center line of the second gear and the third gear.

18 Claims, 9 Drawing Sheets

MARINE PROPULSION DEVICE

CROSS REFERENCE TO RELATED APPLICATIONS

This application claims the benefit of priority to Japanese Patent Application No. 2021-059378 filed on Mar. 31, 2021. The entire contents of this application are hereby incorporated herein by reference.

BACKGROUND OF THE INVENTION

1. Field of the Invention

The present invention relates to a marine propulsion device.

2. Description of the Related Art

There is a marine propulsion device that transmits a power of a drive source by a first shaft and a second shaft extending in different directions from each other. The marine propulsion device includes a gear mechanism for switching the transmission direction of rotation from the first shaft to the second shaft. For example, the outboard motor of Japanese Patent Application Laid-Open No. 2013-049372 includes a drive shaft, a pinion gear, a front bevel gear, a rear bevel gear, a clutch, and a propeller shaft. The pinion gear is connected to the drive shaft. The front bevel gear and the rear bevel gear are disposed so as to face each other and mesh with the pinion gear. The front bevel gear and the rear bevel gear are disposed coaxially with the propeller shaft and are rotatable with respect to the propeller shaft. The pinion gear, the front bevel gear, and the rear bevel gear are disposed in a case, and the case is filled with lubricating oil.

The clutch switches between engagement and disengagement of the front bevel gear and the propeller shaft, and engagement and disengagement of the rear bevel gear and the propeller shaft. For example, the clutch engages the front bevel gear with the propeller shaft and releases the rear bevel gear from the propeller shaft. As a result, the rotation of the drive shaft is transmitted to the propeller shaft in the forward direction. The clutch engages the rear bevel gear with the propeller shaft and releases the front bevel gear from the propeller shaft. As a result, the rotation of the drive shaft is transmitted to the propeller shaft in the reverse direction.

In the above-described outboard motor, the front bevel gear and the rear bevel gear rotate in opposite directions. Therefore, the flow of the lubricating oil due to the rotation of the front bevel gear and the flow of the lubricating oil due to the rotation of the rear bevel gear collide with each other, so that resistance is generated against the rotation of the front bevel gear and the rear bevel gear. As a result, the loss of drive torque transmitted from the drive shaft to the propeller shaft increases.

SUMMARY OF THE INVENTION

Preferred embodiments of the present disclosure improve a transmission efficiency of drive torque in marine propulsion devices.

A marine propulsion device according to a first preferred embodiment of the present invention includes a first gear, a second gear, a third gear, a case, a partition wall, and a first flow path. The second gear meshes with the first gear. The third gear meshes with the first gear. The third gear is coaxial with the second gear. The third gear faces the second gear. The case includes an internal space in which the first gear, the second gear, and the third gear are located. The partition wall is located between the second gear and the third gear in the internal space. The partition wall partitions the internal space into a first space and a second space. The second gear is located in the first space. The third gear is located in the second space. The first flow path communicates the first space with the second space. The first flow path is located on a same side as the first gear with respect to a center line of the second gear and the third gear.

A marine propulsion device according to a second preferred embodiment of the present invention includes a drive source, a first shaft, a first gear, a second shaft, a second gear, a third gear, a clutch, a case, and a partition wall. The first shaft is connected to the drive source. The first shaft extends in a first axial direction. The first gear is connected to the first shaft. The second shaft extends in a second axial direction intersecting the first axial direction. The second gear meshes with the first gear. The second gear is coaxial with the second shaft. The second gear is rotatable with respect to the second shaft. The third gear meshes with the first gear. The third gear is coaxial with the second shaft. The third gear is rotatable with respect to the second shaft. The third gear faces the second gear in the second axial direction. The clutch switches between engagement and disengagement of the second gear and the second shaft, and engagement and disengagement of the third gear and the second shaft. The case includes an internal space in which the first gear, the second gear, and the third gear are located. The partition wall is located between the second gear and the third gear in the internal space. The partition wall partitions the internal space into a first space and a second space. The second gear is located in the first space. The third gear is located in the second space.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
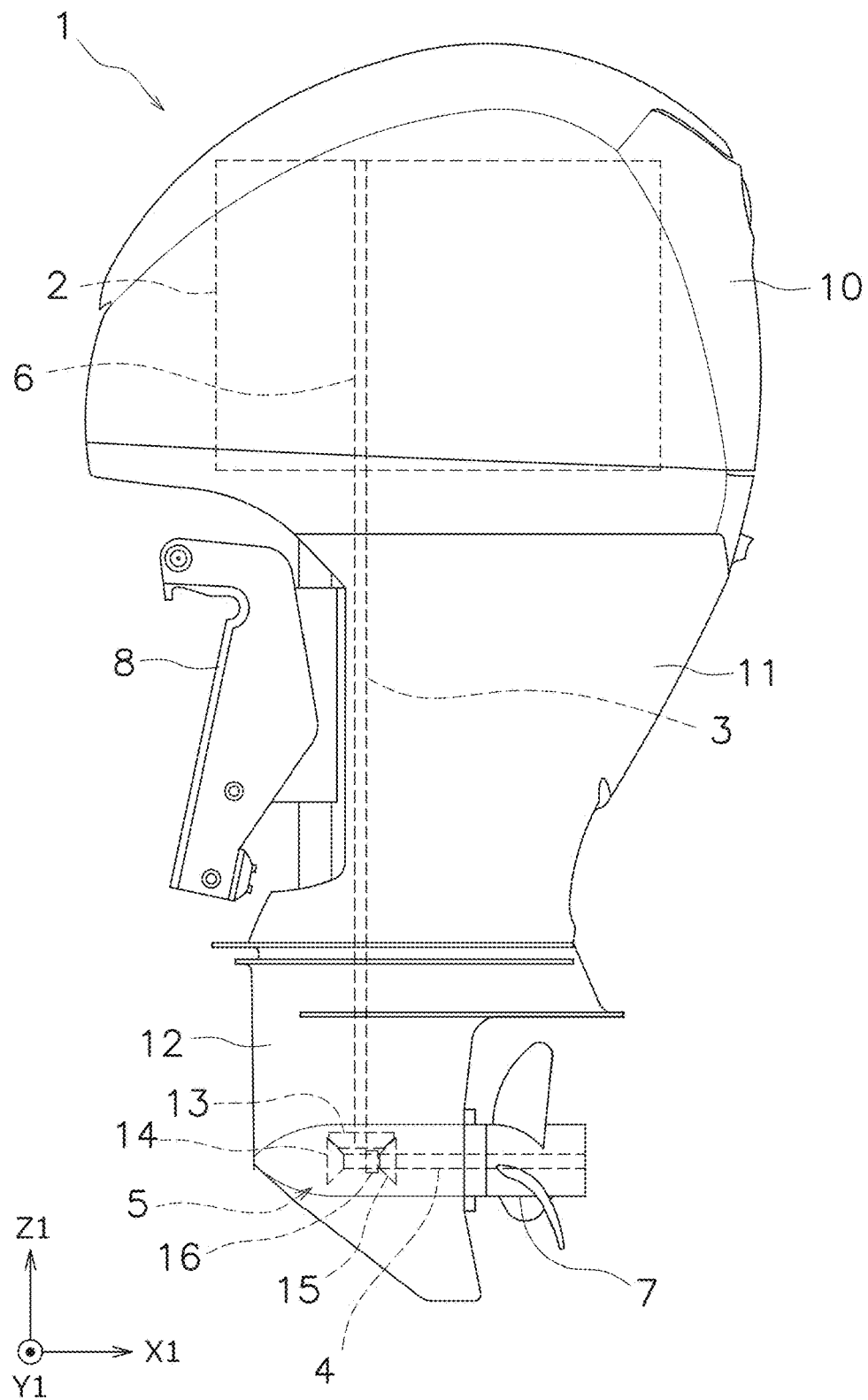
FIG. 1 is a side view of a marine propulsion device according to a first preferred embodiment of the present invention.

Hereinafter, preferred embodiments of the present invention will be described with reference to the drawings. FIG.

1 is a side view of a marine propulsion device 1 according to a first preferred embodiment. The marine propulsion device 1 according to the present preferred embodiment is an outboard motor. The marine propulsion device 1 is attached to a stern of a boat via a bracket 8.

The marine propulsion device 1 includes a drive source 2, a first shaft 3, a second shaft 4, and a shift mechanism 5. The drive source 2 includes, for example, an internal combustion engine. Alternatively, the drive source 2 may include an electric motor. The first shaft 3 is connected to the drive source 2. The first shaft 3 extends in a first axial direction Z1. In the present preferred embodiment, the first axial direction Z1 is the vertical direction of the marine propulsion device 1. The drive source 2 includes a crank shaft 6. The crank shaft 6 extends in the first axial direction Z1. The first shaft 3 is connected to the crank shaft 6.

The second shaft 4 extends in a second axial direction X1. The second axial direction X1 is a direction that intersects the first axial direction Z1. The second axial direction X1 is the front-rear direction of the marine propulsion device 1. The second shaft 4 is connected to the first shaft 3 via the shift mechanism 5. A propeller 7 is attached to the second shaft 4. The propeller 7 is rotated by the torque generated in the drive source 2. As a result, the propeller 7 generates a thrust that propels the boat 100.

The marine propulsion device 1 includes a cowl 10, a housing 11, and a case 12. The drive source 2 is located in the cowl 10. The housing 11 is located below the cowl 10. The case 12 is located below the housing 11. The first shaft 3 is located in the housing 11 and the case 12.

Figure 2:
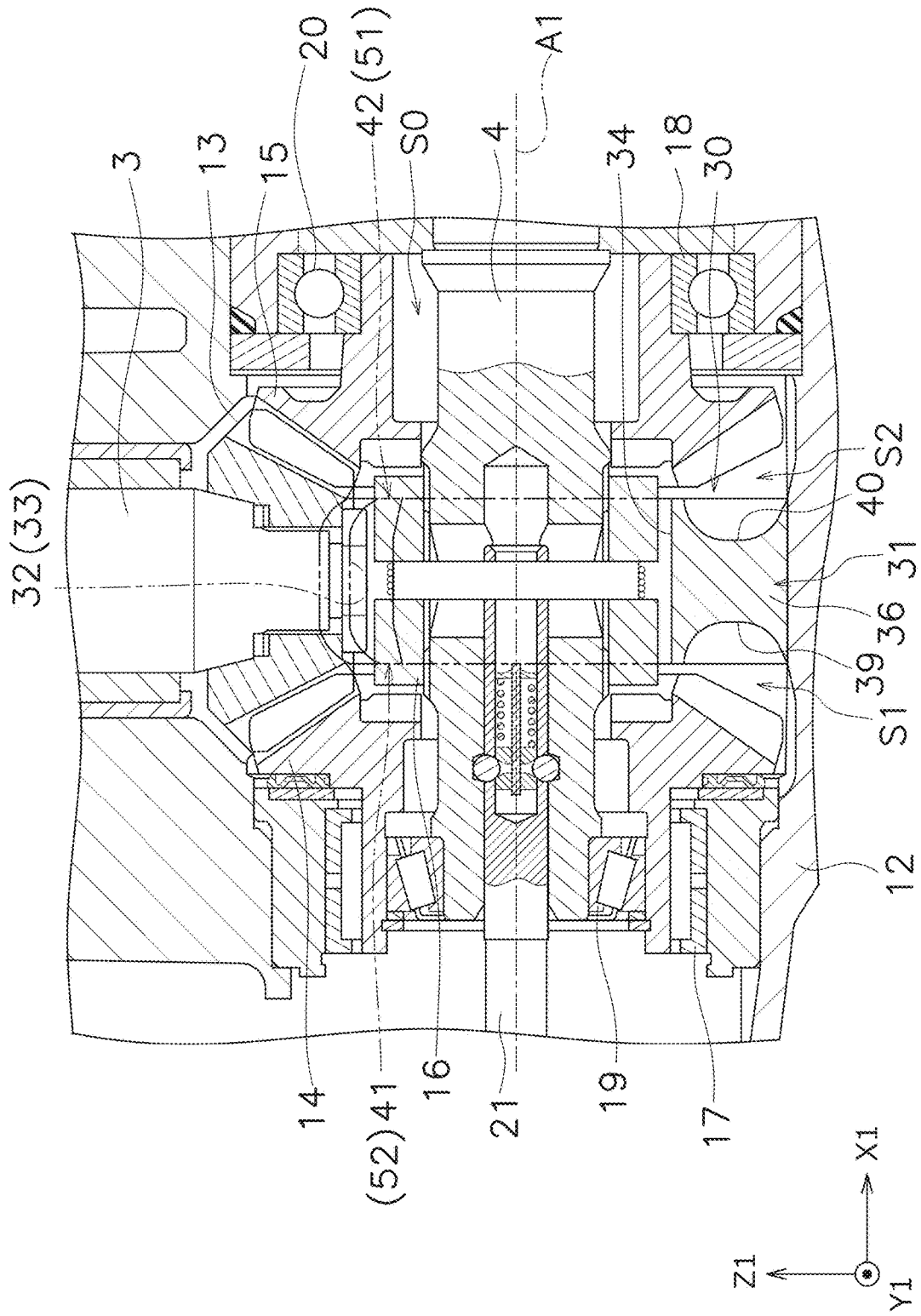
FIG. 2 is a cross-sectional view of a shift mechanism in a case.

FIG. 2 is a cross-sectional view of the shift mechanism 5 in the case 12. As shown in FIG. 2, the case 12 includes an internal space S0 in which the shift mechanism 5 is located. The internal space S0 is filled with lubricating oil. The shift mechanism 5 includes a first gear 13, a second gear 14, a third gear 15, and a clutch mechanism 16. The first gear 13 is connected to the first shaft 3. The first gear 13 is fixed to a lower end of the first shaft 3 and rotates together with the first shaft 3. The second gear 14 and the third gear 15 mesh with the first gear 13. The first to third gears 13 to 15 are, for example, bevel gears.

The second gear 14 is rotatably supported by the case 12 via a bearing 17. The third gear 15 faces the second gear 14 in the second axial direction X1. The third gear 15 is rotatably supported by the case 12 via a bearing 18. The third gear 15 rotates in the direction opposite to that of the second gear 14. The second shaft 4 extends in the second axial direction X1 through the second gear 14 and the third gear 15. The second gear 14 and the third gear 15 are coaxial with the second shaft 4. The second shaft 4 is supported by the second gear 14 via a bearing 19. The second gear 14 is supported by the case 12 via the bearing 17. The third gear 15 is supported by the case 12 via a bearing 20. The second gear 14 and the third gear 15 are rotatable with respect to the second shaft 4.

The clutch mechanism 16 switches between engagement and disengagement of the second gear 14 and the second shaft 4, and engagement and disengagement of the third gear 15 and the second shaft 4. The clutch mechanism 16 is, for example, a dog clutch. However, the clutch mechanism 16 may be a clutch of a different type from the dog clutch. The clutch mechanism 16 rotates together with the second shaft 4. The clutch mechanism 16 is located below the first gear 13. The clutch mechanism 16 is located between the second gear 14 and the third gear 15 in the second axial direction X1.

The clutch mechanism 16 is movable in the second axial direction X1. A shift shaft 21 is connected to the clutch mechanism 16. The shift shaft 21 is connected to a shift actuator (not shown). The shift shaft 21 is moved in the second axial direction X1 by electrically controlling the shift actuator. Alternatively, the shift shaft 21 may be connected to a shift rod. The shift shaft 21 may be moved in the second axial direction X1 by manually operating the shift rod.

Specifically, the clutch mechanism 16 is movable to a neutral position, a first position, and a second position shown in FIG. 2. The clutch mechanism 16 meshes with the second gear 14 at the first position. The clutch mechanism 16 engages the second gear 14 and the second shaft 4 at the first position, and releases the third gear 15 from the second shaft 4. As a result, the rotation of the first gear 13 is transmitted to the second shaft 4 via the second gear 14. The third gear 15 idles with respect to the second shaft 4. As a result, the second gear 14 and the second shaft 4 rotate in a first rotation direction.

The clutch mechanism 16 meshes with the third gear 15 at the second position. The clutch mechanism 16 engages the third gear 15 and the second shaft 4 at the second position, and releases the second gear 14 from the second shaft 4. As a result, the rotation of the first gear 13 is transmitted to the second shaft 4 via the third gear 15. The second gear 14 idles with respect to the second shaft 4. As a result, the third gear 15 and the second shaft 4 rotate in a second rotation direction. The second rotation direction is opposite to the first rotation direction.

The clutch mechanism 16 does not mesh with either the second gear 14 or the third gear 15 in the neutral position. Therefore, both the second gear 14 and the third gear 15 idle with respect to the second shaft 4. Therefore, the rotation of the first gear 13 is not transmitted to the second shaft 4. The first rotation direction may be the forward direction, and the second rotation direction may be the reverse direction. Alternatively, the first rotation direction may be the reverse direction and the second rotation direction may be the forward direction.

Figure 3:
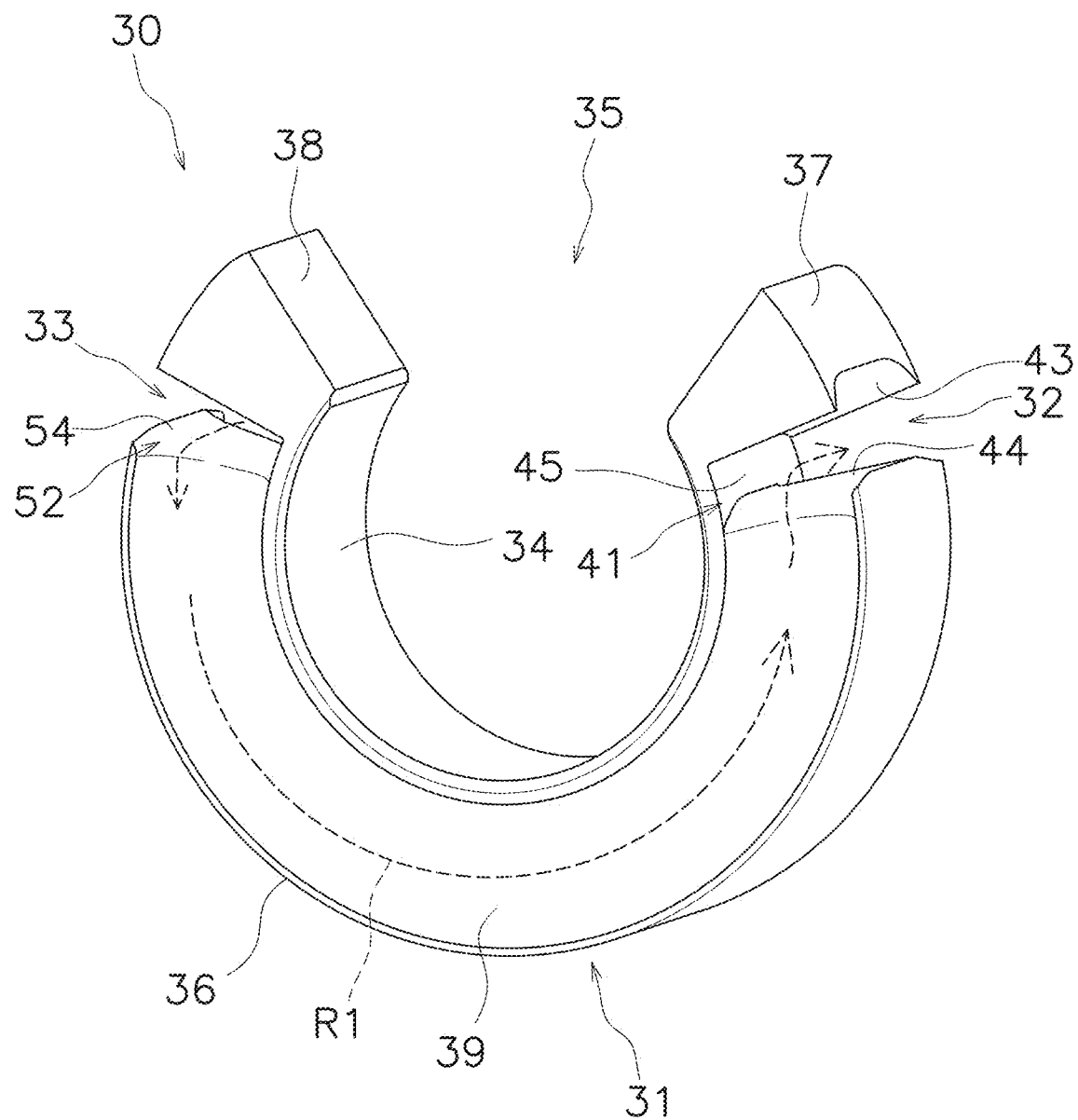
FIG. 3 is a perspective view of a circulator.
Figure 4:
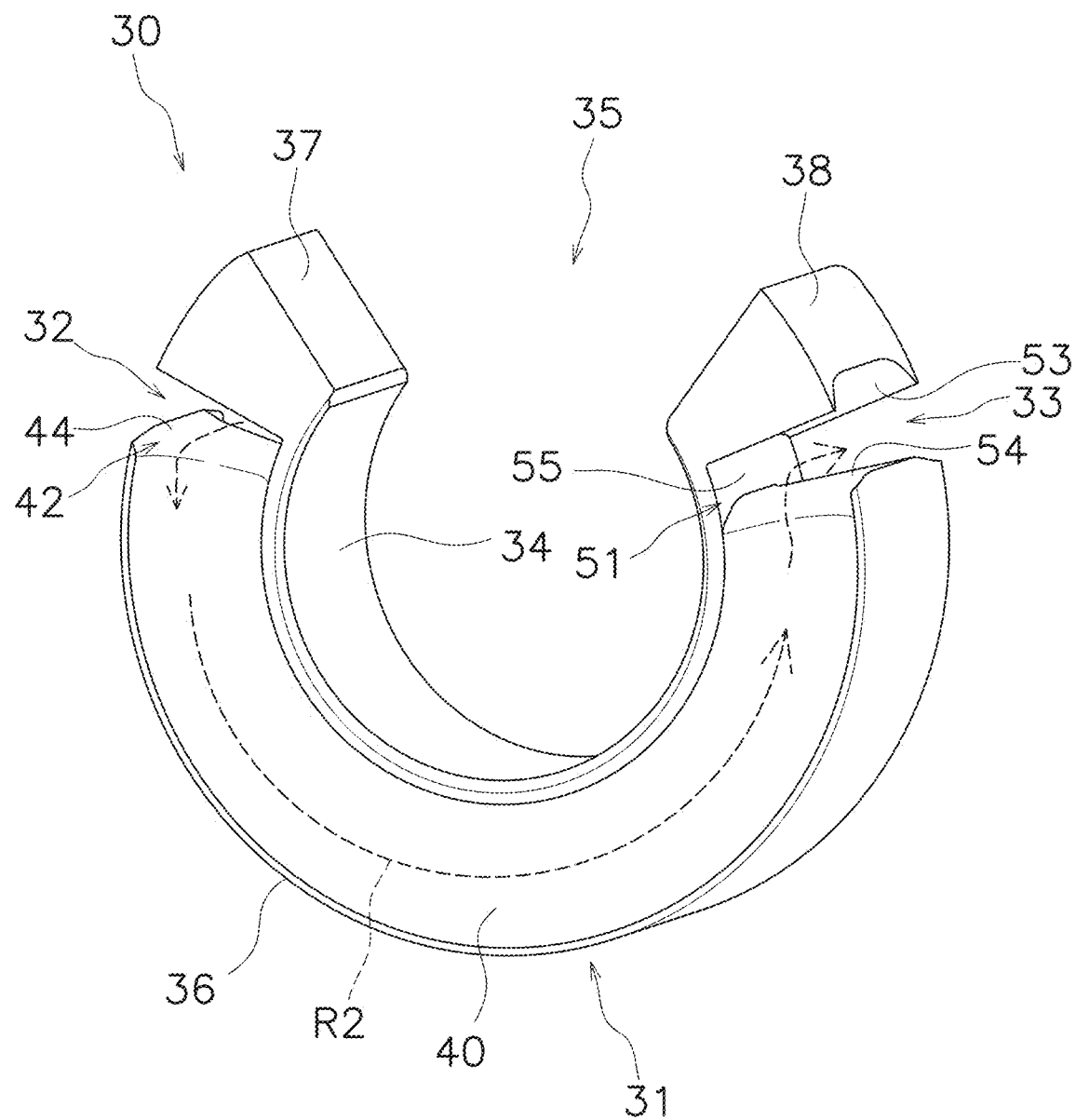
FIG. 4 is a perspective view of the circulator.
Figure 5:
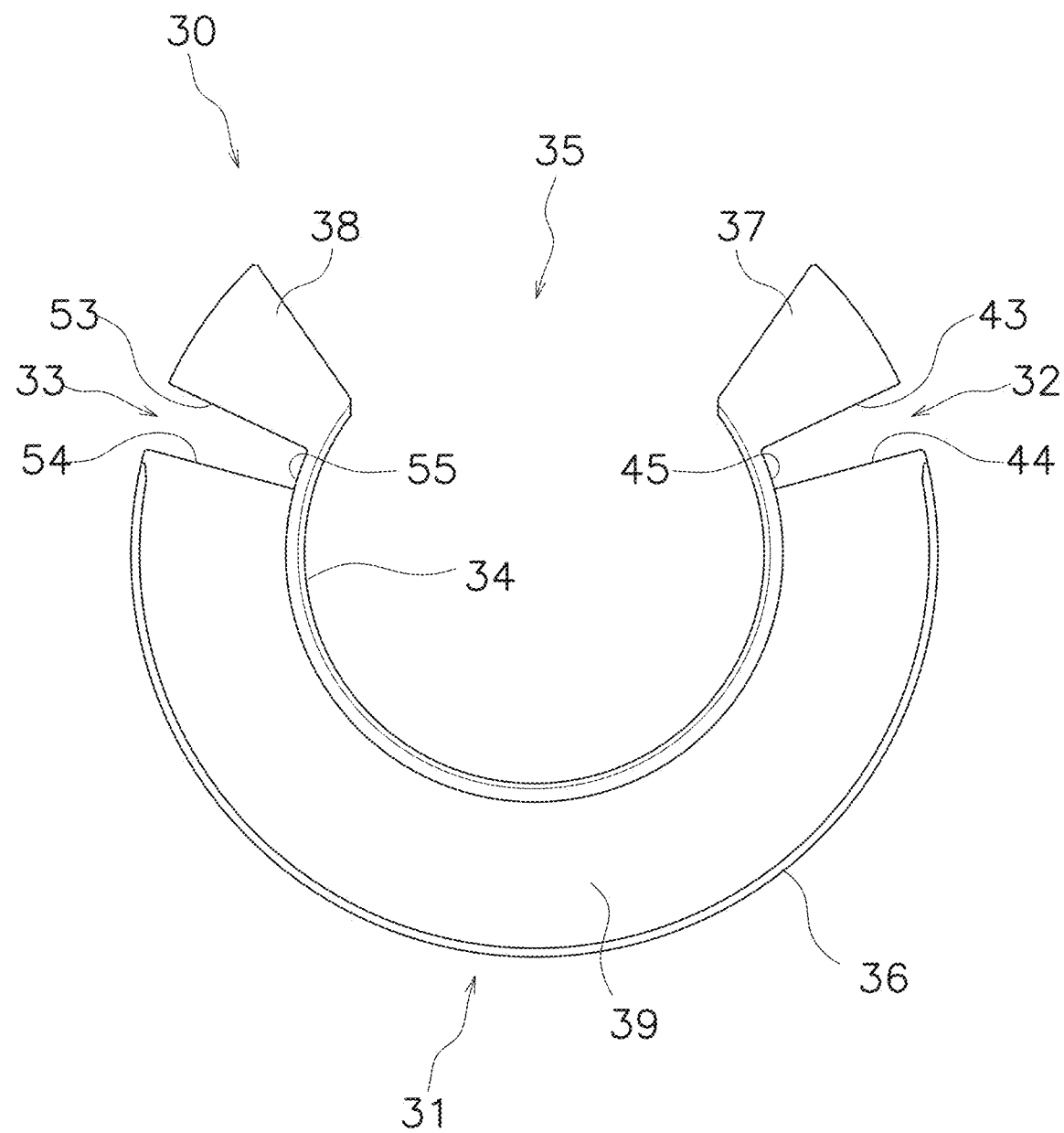
FIG. 5 is a front view of the circulator.
Figure 6:
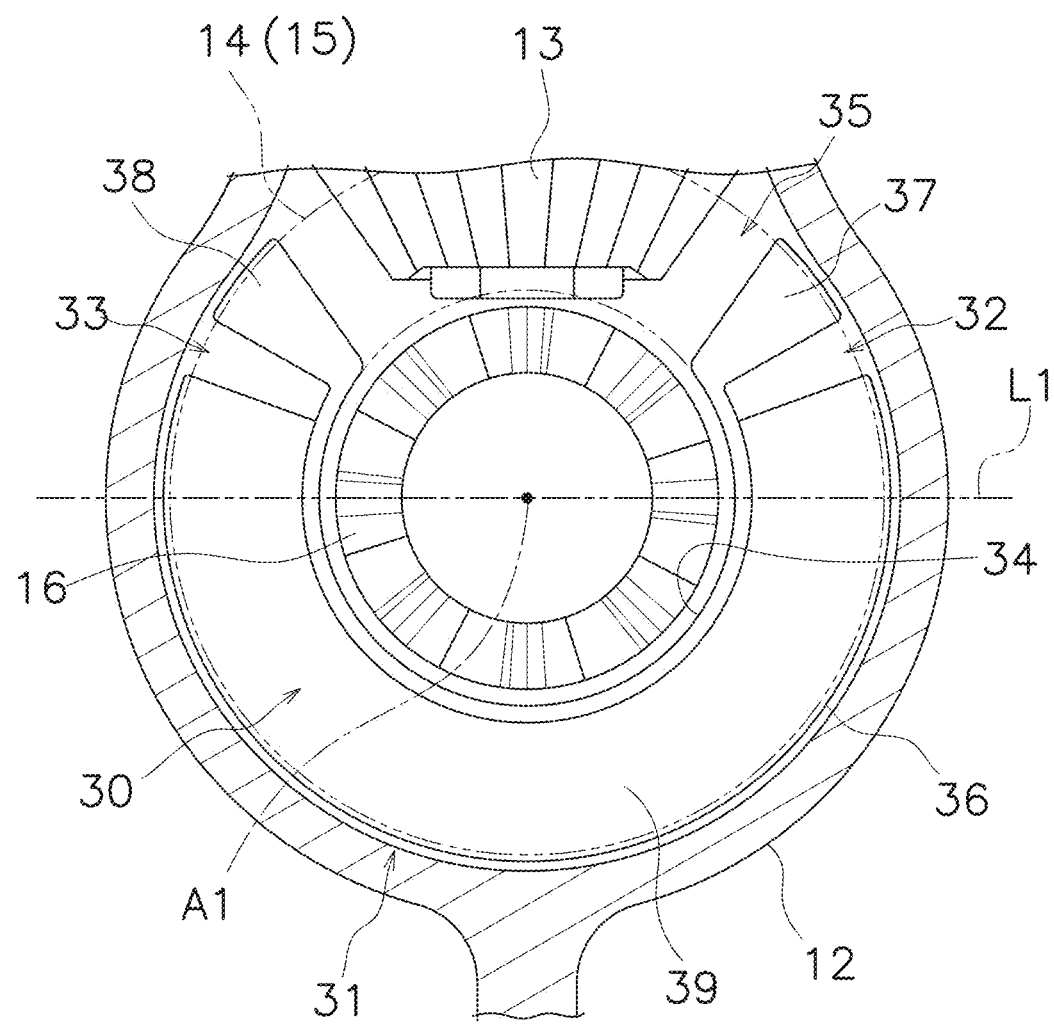
FIG. 6 is a cross-sectional view of an inside of the case as seen from a second axial direction.

The marine propulsion device 1 includes a circulator 30. The circulator 30 is located in the internal space S0 of the case 12. FIGS. 3 and 4 are perspective views of the circulator 30. FIG. 5 is a front view of the circulator 30. FIG. 6 is a cross-sectional view of the inside of the case 12 as seen from the second axial direction X1. As shown in FIGS. 3 to 6, the circulator 30 includes a partition wall 31, a first flow path 32, and a second flow path 33.

The partition wall 31 includes an arcuate outer shape as seen from the second axial direction X1. The partition wall 31 is located between the second gear 14 and the third gear 15 in the internal space S0. The partition wall 31 divides the internal space S0 into a first space S1 and a second space S2. The second gear 14 is located in the first space S1. The third gear 15 is located in the second space S2.

The partition wall 31 includes a central hole 34, an opening 35, a first wall portion 36, a second wall portion 37, and a third wall portion 38. The central hole 34 extends through the partition wall 31 in the second axial direction X1. The clutch mechanism 16 is located in the central hole 34. The second shaft 4 extends through the central hole 34. The opening 35 extends radially outward from the central hole 34. The opening 35 extends in the first axial direction Z1. Specifically, the opening 35 extends upward from the central hole 34. The first gear 13 is located in the opening 35.

The first to third wall portions 36 to 38 are located radially outward of the central hole 34. The first to third wall portions 36 to 38 face the second gear 14 and the third gear 15 in the second axial direction X1. The first wall portion 36 has an arcuate shape. A central angle of the first wall portion 36 is larger than 180 degrees. The first wall portion 36 extends above a center of the partition wall 31.

The second wall portion 37 is located between the opening 35 and the first wall portion 36 in a circumferential direction of the partition wall 31. The second wall portion 37 has an arcuate shape. A central angle of the second wall portion 37 is smaller than the central angle of the first wall portion 36. As shown in FIG. 6, the third wall portion 38 is located opposite to the second wall portion 37 in a third direction Y1. The third direction Y1 is a direction perpendicular to the first axial direction Z1 as seen from the second axial direction X1. The third direction Y1 is the left-right direction of the marine propulsion device 1. The third wall portion 38 is located between the opening 35 and the first wall portion 36 in the circumferential direction of the partition wall 31. The opening 35 is located between the second wall portion 37 and the third wall portion 38. The third wall portion 38 has an arcuate shape. A central angle of the third wall portion 38 is smaller than the central angle of the first wall portion 36.

As shown in FIG. 3, the first wall portion 36 includes a first concave groove 39. The first concave groove 39 faces the second gear 14. The first concave groove 39 is recessed in the second axial direction X1 from the surface of the first wall portion 36. As shown in FIG. 2, the first concave groove 39 has a curved surface shape. The first concave groove 39 extends along the circumferential direction of the first wall portion 36. The first concave groove 39 extends along the rotation direction of the second gear 14.

As shown in FIG. 4, the first wall portion 36 includes a second concave groove 40. The second concave groove 40 is located on the surface of the first wall portion 36 opposite to the first concave groove 39. The second concave groove 40 faces the third gear 15. The second concave groove 40 is recessed in the second axial direction X1 from the surface of the first wall portion 36. As shown in FIG. 2, the second concave groove 40 has a curved surface shape. The second concave groove 40 extends along the circumferential direction of the first wall portion 36. The second concave groove 40 extends along the rotation direction of the third gear 15.

The first flow path 32 penetrates the circulator 30 in the second axial direction X1. The first flow path 32 communicates the first space S1 with the second space S2. The first flow path 32 is located on the same side as the first gear 13 with respect to a center line A1 of the second shaft 4 extending in the second axial direction X1. That is, the first flow path 32 is located above the center line A1 of the second shaft 4. The first flow path 32 is located between the first wall portion 36 and the second wall portion 37. At least a portion of the first flow path 32 is located between the first gear 13 and the center line A1 of the second shaft 4 in the first axial direction Z1.

As shown in FIG. 6, the first flow path 32 is located between the opening 35 and a virtual line L1 in the circumferential direction of the circulator 30 as seen from the second axial direction X1. The virtual line L1 extends through the center line A1 of the second shaft 4 and extends in the third direction Y1 as seen from the second axial direction X1. As shown in FIGS. 2 to 4, the first flow path 32 includes a first inlet 41 and a first outlet 42.

The first inlet 41 communicates with the first space S1. The first inlet 41 faces the second gear 14 in the second axial direction X1. The first outlet 42 communicates with the second space S2. The first outlet 42 faces the third gear 15 in the second axial direction X1. As shown in FIG. 3, the first flow path 32 includes a first upper surface 43, a first bottom surface 44, and a first side surface 45. The first upper surface 43 has a curved surface shape that is recessed upward. The first bottom surface 44 has a curved surface shape that is curved upward. The first side surface 45 is located between the central hole 34 and the first flow path 32.

The second flow path 33 is located on the opposite side of the first flow path 32 with respect to an axis of symmetry extending in the first axial direction Z1 as seen from the second axial direction X1. The second flow path 33 has a shape symmetrical to that of the first flow path 32. The second flow path 33 extends through the circulator 30 in the second axial direction X1. The second flow path 33 communicates the first space S1 with the second space S2. The second flow path 33 is located on the same side as the first gear 13 with respect to the center line A1 of the second shaft 4. That is, the second flow path 33 is located above the center line A1 of the second shaft 4.

The second flow path 33 is located between the first wall portion 36 and the third wall portion 38. At least a portion of the second flow path 33 is located between the first gear 13 and the center line A1 of the second shaft 4 in the first axial direction Z1. As shown in FIG. 6, the second flow path 33 is located between the opening 35 and the virtual line L1 in the circumferential direction of the circulator 30 as seen from the second axial direction X1.

The second flow path 33 includes a second inlet 51 and a second outlet 52. The second inlet 51 communicates with the second space S2. The second inlet 51 faces the third gear 15 in the second axial direction X1. The second outlet 52 communicates with the first space S1. The second outlet 52 faces the second gear 14 in the second axial direction X1. As shown in FIG. 4, the second flow path 33 includes a second upper surface 53, a second bottom surface 54, and a second side surface 55. The second upper surface 53 has a curved surface shape that is recessed upward. The second bottom surface 54 has a curved surface shape that is curved upward. The second side surface 55 is located between the central hole 34 and the second flow path 33.

In the marine propulsion device 1 according to the present preferred embodiment described above, the internal space S0 of the case 12 is partitioned into the first space S1 in which the second gear 14 is located and the second space S2 in which the third gear 15 is located by the partition wall 31. As a result, it is possible to prevent the flow of the lubricating oil due to the rotation of the second gear 14 from colliding with the flow of the lubricating oil due to the rotation of the third gear 15. As a result, the loss of drive torque is significantly reduced or prevented. As a result, the transmission efficiency of the drive torque is improved.

The first flow path 32 and the second flow path 33 are located near the first gear 13. For example, in the first space S1, the pressure of the lubricating oil becomes high near the first gear 13 before the first gear 13 meshes with the second gear 14. Further, in the second space S2, the pressure of the lubricating oil becomes low near the first gear 13 after the first gear 13 meshes with the third gear 15. That is, the pressure of the lubricating oil on the first outlet 42 side of the first flow path 32 is lower than the pressure of the lubricating oil on the first inlet 41 side. Due to this pressure difference, a portion of the lubricating oil that rotates and flows with the rotation of the second gear 14 flows from the first space S1 to the second space S2 through the first flow path 32, and merges with the lubricating oil that rotates and flows with the rotation of the third gear 15 in the second space S2.

In the second space S2, the pressure of the lubricating oil becomes high near the first gear 13 before the first gear 13 meshes with the third gear 15. Further, in the first space S1, the pressure of the lubricating oil becomes low near the first gear 13 after the first gear 13 meshes with the second gear 14. That is, the pressure of the lubricating oil on the second outlet 52 side of the second flow path 33 is lower than the pressure of the lubricating oil on the second inlet 51 side. Due to this pressure difference, a portion of the lubricating oil that rotates and flows with the rotation of the third gear 15 flows from the second space S2 to the first space S1 through the second flow path 33, and merges with the lubricating oil that rotates and flows with the rotation of the second gear 14 in the first space S1.

As described above, in the marine propulsion device 1 according to the present preferred embodiment, as shown in FIG. 3, the lubricating oil flowing in the rotation direction R1 of the second gear 14 in the first space S1 is converted into a flow in the rotation direction R2 of the third gear 15 as shown in FIG. 4 by the circulator 30 and flows to the second space S2. Further, the lubricating oil flowing in the rotation direction R2 of the third gear 15 in the second space S2 is converted into a flow in the rotation direction R1 of the second gear 14 by the circulator 30 and flows to the first space S1. Thus, the lubricating oil is efficiently circulated between the first space S1 and the second space S2. Further, the resistance of the lubricating oil flow to the rotation of the second gear 14 and the third gear 15 is reduced. As a result, the transmission efficiency of the drive torque is further improved. In addition, the temperature rise of the lubricating oil is significantly reduced or prevented.

Although preferred embodiments of the present invention have been described above, the present invention is not limited to the above-described preferred embodiments, and various modifications can be made without departing from the gist of the present invention.

Figure 7:
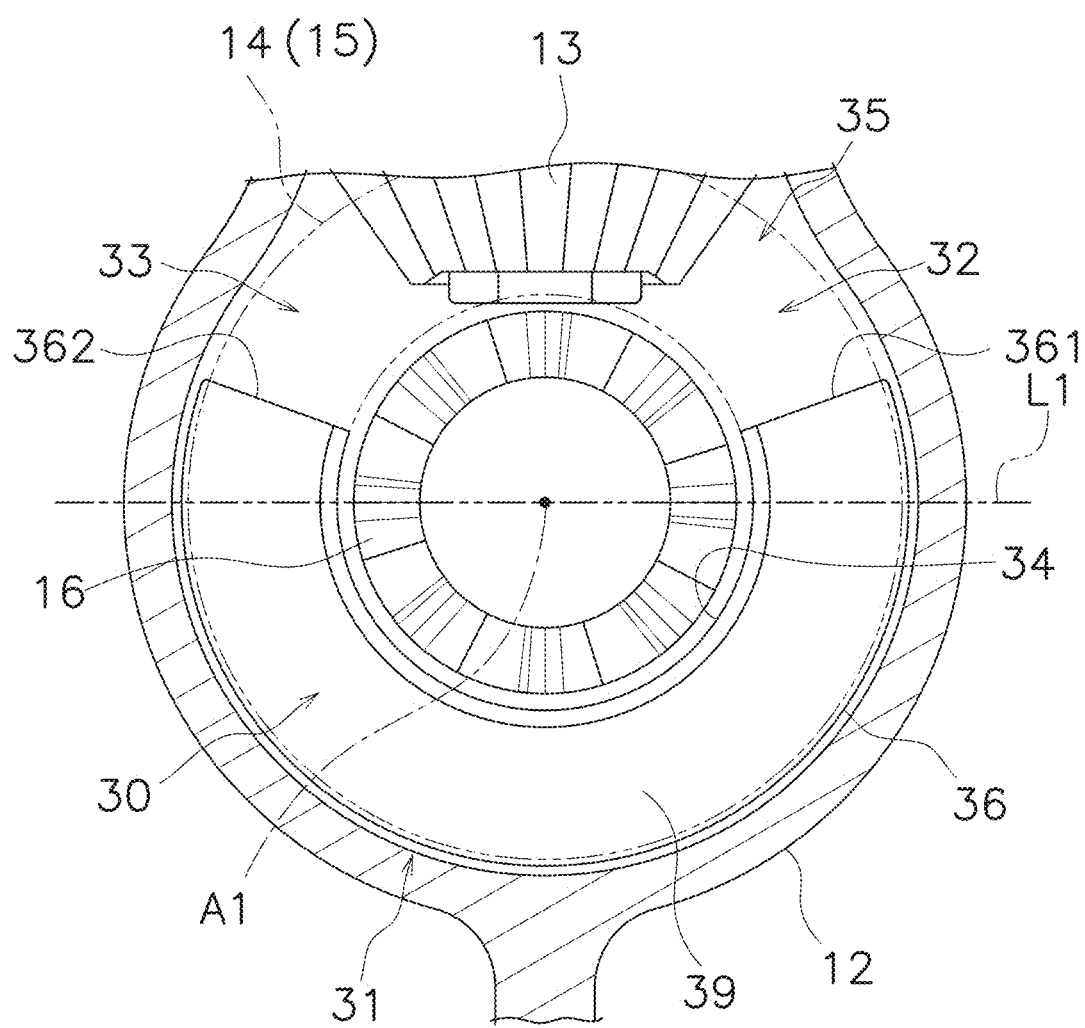
FIG. 7 is a diagram showing a circulator according to a first modification of a preferred embodiment of the present invention.

The marine propulsion device 1 is not limited to the outboard motor and may be changed. For example, the marine propulsion device 1 may be a sterndrive motor or a jet propulsion device. The shape of the circulator 30 is not limited to that of the above-described preferred embodiments, and may be changed. For example, FIG. 7 is a diagram showing the circulator 30 according to a first modified preferred embodiment. As shown in FIG. 7, the second wall portion 37 and the third wall portion 38 may be omitted. In that case, a space between a first end portion 361 of the first wall portion 36 and the first gear 13 may be used as the first flow path 32. Further, a space between a second end portion 362 of the first wall portion 36 and the first gear 13 may be used as the second flow path 33.

The shape of the partition wall 31 is not limited to that of the above-described preferred embodiments, and may be changed. For example, the first concave groove 39 and the second concave groove 40 may be omitted. The shapes of the first flow path 32 and the second flow path 33 are not limited to those of the above-described preferred embodiments, and may be changed. For example, the first upper surface 43 and the second upper surface 53 may have flat shapes. The first bottom surface 44 and the second bottom surface 54 may have flat shapes.

Figure 8:
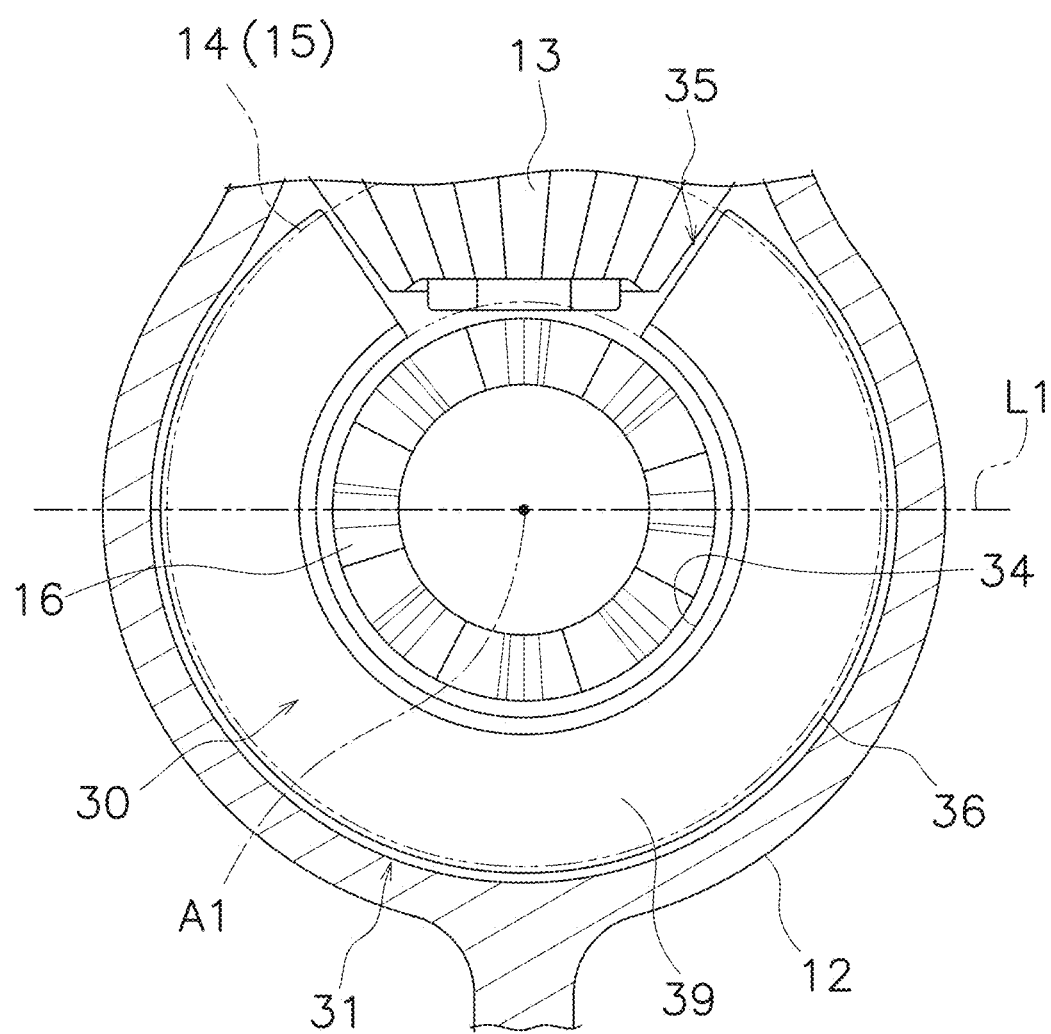
FIG. 8 is a diagram showing a circulator according to a second modification of a preferred embodiment of the present invention.

One or both of the first flow path 32 and the second flow path 33 may be omitted. For example, FIG. 8 is a diagram showing the circulator 30 according to a second modified preferred embodiment. As shown in FIG. 8, both the first flow path 32 and the second flow path 33 may be omitted. Also in this case, it is possible to prevent the flow of the lubricating oil due to the rotation of the second gear 14 from colliding with the flow of the lubricating oil due to the rotation of the third gear 15. As a result, the loss of drive torque is significantly reduced or prevented. As a result, the transmission efficiency of the drive torque is improved.

Figure 9:
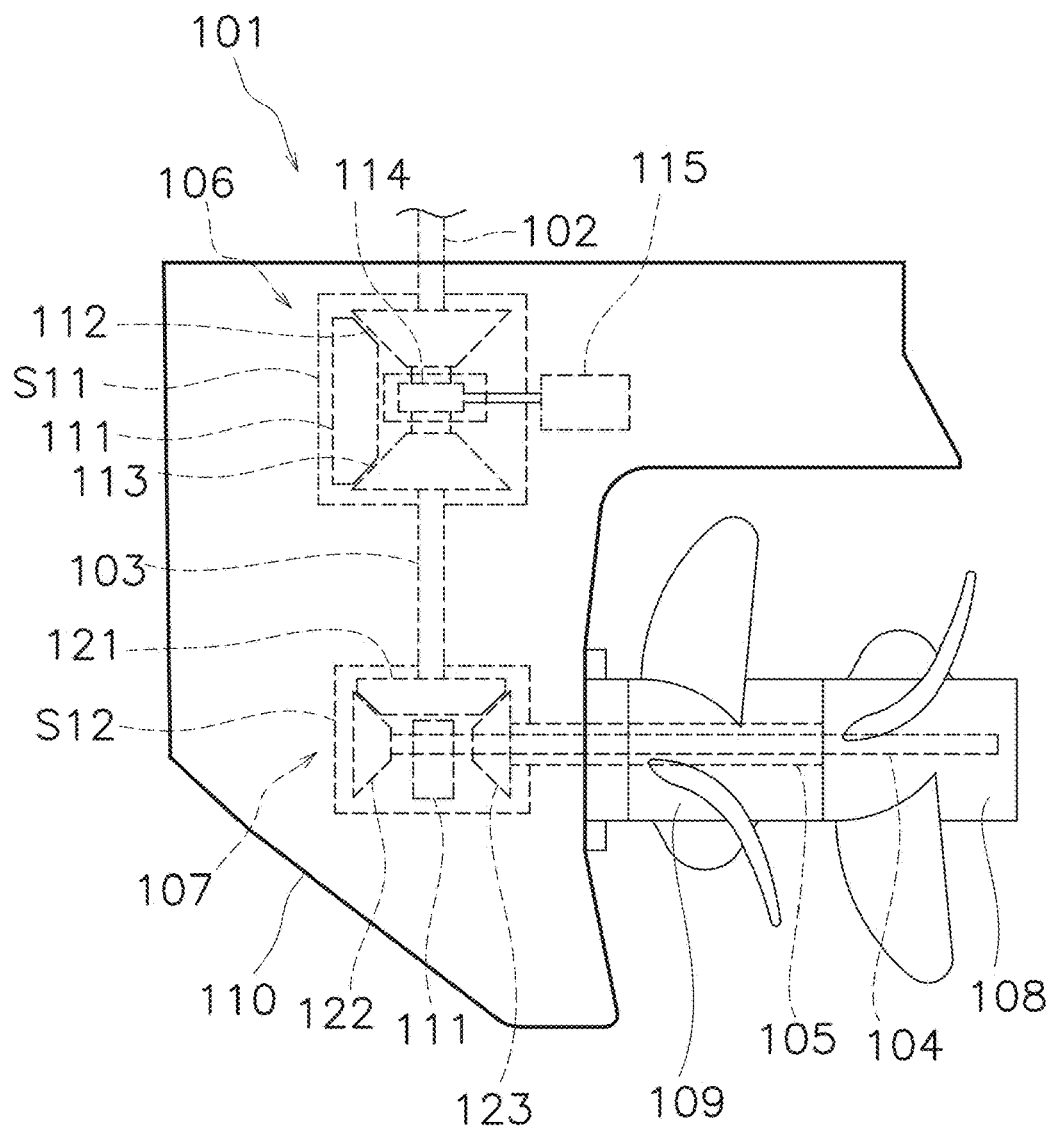
FIG. 9 is a side view of a marine propulsion device according to a second preferred embodiment of the present invention.

The marine propulsion device 1 may be an outboard motor including contra-rotating propellers. For example, FIG. 9 is a side view showing a marine propulsion device 101 according to a second preferred embodiment. The marine propulsion device 101 includes a first upper shaft 102, a first lower shaft 103, a second shaft 104, a third shaft 105, a shift mechanism 106, and a gear mechanism 107.

The first upper shaft 102 is connected to the drive source 2 and extends in the first axial direction Z1. The first lower shaft 103 is separate from the first upper shaft 102. The first lower shaft 103 is located below the first upper shaft 102 and extends in the first axial direction Z1. The second shaft 104 extends in the second axial direction X1. The third shaft 105 is coaxial with the second shaft 104 on the outer peripheral side of the second shaft 104. The third shaft 105 is rotatable with respect to the second shaft 104. A first propeller 108 is connected to the second shaft 104. A second propeller 109 is connected to the third shaft 105. The fins of the second propeller 109 are twisted in the direction opposite to the fins of the first propeller 108.

The shift mechanism 106 is located in the first internal space S11 in the case 110. The shift mechanism 106 may be disposed at a location other than the case 110. The shift mechanism 106 includes a first gear 111, a second gear 112, a third gear 113, and a clutch mechanism 114. The second gear 112 is coaxial with the first upper shaft 102. The first gear 111, the second gear 112, and the third gear 113 are, for example, bevel gears. The second gear 112 is connected to the first upper shaft 102. The third gear 113 is coaxial with the first lower shaft 103. The third gear 113 is rotatable with respect to the first lower shaft 103. The first gear 111 is located between the second gear 112 and the third gear 113, and meshes with the second gear 112 and the third gear 113.

The clutch mechanism 114 is connected to an actuator 115 and is operated by the actuator 115. The clutch mechanism 114 includes, for example, a plurality of clutches. The clutch mechanism 114 switches between engagement and disengagement of the second gear 112 and the first lower shaft 103, and engagement and disengagement of the third gear 113 and the first lower shaft 103.

The gear mechanism 107 is located in the second internal space S12 in the case 110. The gear mechanism 107 transmits the rotation of the first lower shaft 103 to the second shaft 104 in a predetermined rotation direction, and transmits the rotation of the first lower shaft 103 to the third shaft 105 in the direction opposite to the predetermined rotation direction. The gear mechanism 107 includes a first gear 121, a second gear 122, and a third gear 123. The first gear 121, the second gear 122, and the third gear 123 have the same structures as the first gear 13, the second gear 14, and the third gear 15 of the above-described preferred embodiments, respectively.

The clutch mechanism 114 switches the shift mechanism 106 between the first state and the second state. In the first state, the clutch mechanism 114 engages the second gear 112 with the first lower shaft 103 and releases the third gear 113 from the first lower shaft 103. As a result, the rotation of the first upper shaft 102 is transmitted to the first lower shaft 103 in the same rotation direction. The rotation of the first lower shaft 103 is transmitted to the first propeller 108 via the first gear 121, the second gear 122, and the second shaft 104 of the gear mechanism 107. Further, the rotation of the first lower shaft 103 is transmitted to the second propeller 109 via the first gear 121, the third gear 123, and the third shaft 105 of the gear mechanism 107. As a result, the first propeller 108 and the second propeller 109 rotate, for example, in the forward directions. The forward directions of the first propeller 108 and the second propeller 109 are opposite to each other.

In the second state, the clutch mechanism 114 releases the second gear 112 from the first lower shaft 103, and engages the third gear 113 with the first lower shaft 103. As a result, the rotation of the first upper shaft 102 is transmitted to the first lower shaft 103 in the direction opposite to the rotation of the first upper shaft 102 via the second gear 112, the first gear 111, and the third gear 113. The rotation of the first lower shaft 103 is transmitted to the first propeller 108 via the first gear 121, the second gear 122, and the second shaft 104 of the gear mechanism 107. Further, the rotation of the first lower shaft 103 is transmitted to the second propeller 109 via the first gear 121, the third gear 123, and the third shaft 105 of the gear mechanism 107. As a result, the first propeller 108 and the second propeller 109 rotate, for example, in the reverse directions. Contrary to the above, in the first state, the first propeller 108 and the second propeller 109 may rotate in the reverse directions, and in the second state, the first propeller 108 and the second propeller 109 may rotate in the forward directions.

Other configurations of the marine propulsion device 101 according to the second preferred embodiment are the same as those of the marine propulsion device 1 according to the first preferred embodiment described above. A partition wall similar to the partition wall 31 according to the first preferred embodiment may be located between the second gear 112 and the third gear 113 of the shift mechanism 106 in the first internal space S11 of the second preferred embodiment. Alternatively, a partition wall similar to the partition wall 31 according to the first preferred embodiment may be located between the second gear 112 and the third gear 113 of the gear mechanism 107 in the second internal space S12 of the second preferred embodiment. Alternatively, partition walls similar to the partition wall 31 according to the first preferred embodiment may be provided in both the first internal space S11 and the second internal space S12 of the second preferred embodiment, respectively.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine propulsion device comprising:
   a first gear;
   a second gear that meshes with the first gear;
   a third gear that meshes with the first gear, is coaxial with the second gear, and faces the second gear;
   a case including an internal space in which the first gear, the second gear, and the third gear are located;
   a partition wall located between the second gear and the third gear in the internal space, and that partitions the internal space into a first space in which the second gear is located and a second space in which the third gear is located; and
   a first flow path that communicates the first space with the second space and is located on a same side as the first gear with respect to a center line of the second gear and the third gear.

2. The marine propulsion device according to claim 1, further comprising:
   a drive source;
   a first shaft connected to the drive source and extending in a first axial direction;
   a second shaft extending in a second axial direction intersecting the first axial direction; and
   a clutch; wherein
   the first gear is connected to the first shaft;
   the second gear is coaxial with the second shaft and is rotatable with respect to the second shaft;
   the third gear is coaxial with the second shaft, is rotatable with respect to the second shaft, and faces the second gear in the second axial direction; and
   the clutch switches between engagement and disengagement of the second gear and the second shaft, and engagement and disengagement of the third gear and the second shaft.

3. The marine propulsion device according to claim 2, wherein
   the partition wall includes:
      a central hole extending in the second axial direction; and
      a wall portion disposed radially outward of the central hole;
   the second shaft extends through the central hole; and
   the wall portion faces the second gear and the third gear in the second axial direction.

4. The marine propulsion device according to claim 3, wherein the wall portion includes a first concave groove that faces the second gear and extends along a rotation direction of the second gear.

5. The marine propulsion device according to claim 3, wherein the wall portion includes a second concave groove that faces the third gear and extends along a rotation direction of the third gear.

6. The marine propulsion device according to claim 2, wherein
   the first flow path includes a first inlet that communicates with the first space; and
   the first inlet faces the second gear in the second axial direction.

7. The marine propulsion device according to claim 2, wherein
   the first flow path includes a first outlet that communicates with the second space; and
   the first outlet faces the third gear in the second axial direction.

8. The marine propulsion device according to claim 2, wherein at least a portion of the first flow path is located between the first gear and the center line of the second gear and the third gear in the first axial direction.

9. The marine propulsion device according to claim 2, further comprising:
   a second flow path that communicates the first space and the second space with each other, and located on the same side as the first gear with respect to the center line of the second gear and the third gear.

10. The marine propulsion device according to claim 9, wherein the second flow path is located on an opposite side of the first flow path with respect to the first axial direction as seen from the second axial direction.

11. The marine propulsion device according to claim 9, wherein
    the second flow path includes a second inlet that communicates with the second space; and
    the second inlet faces the third gear in the second axial direction.

12. The marine propulsion device according to claim 9, wherein the second flow path includes a second outlet that communicates with the first space; and the second outlet faces the second gear in the second axial direction.

13. The marine propulsion device according to claim 9, wherein at least a portion of the second flow path is located between the first gear and the center line of the second gear and the third gear in the first axial direction.

14. The marine propulsion device according to claim 9, further comprising:
   a circulator including the partition wall, the first flow path, and the second flow path; wherein
   the first flow path and the second flow path extend through the circulator in the second axial direction.

15. The marine propulsion device according to claim 14, wherein
   the circulator includes:
      a central hole that extends in the second axial direction; and
      an opening that extends radially outward from the central hole; and
   the second shaft extends through the central hole, and the first gear is located in the opening.

16. The marine propulsion device according to claim 15, wherein
   the circulator has an arcuate outer shape as seen from the second axial direction;
   the first flow path is located between the opening and a virtual line in a circumferential direction of the circulator as seen from the second axial direction;
   the virtual line extends in a third direction perpendicular to the first axial direction through the center line of the second gear and the third gear as seen from the second axial direction;
   the second flow path is located between the opening and the virtual line in the circumferential direction of the circulator as seen from the second axial direction; and
   the second flow path is located on an opposite side of the first flow path with respect to the first axial direction as seen from the second axial direction.

17. The marine propulsion device according to claim 1, further comprising:
   a drive source;
   a first upper shaft connected to the drive source and extending in a first axial direction;
   a first lower shaft separate from the first upper shaft and extending in the first axial direction;
   a second shaft extending in a second axial direction intersecting the first axial direction;
   a third shaft coaxial with the second shaft on an outer peripheral side of the second shaft and is rotatable with respect to the second shaft;
   a clutch; and
   a gearing; wherein
   the second gear is coaxial with the first upper shaft and is connected to the first upper shaft;
   the third gear is coaxial with the first lower shaft and is rotatable with respect to the first lower shaft;
   the clutch switches between engagement and disengagement of the second gear and the first lower shaft, and engagement and disengagement of the third gear and the first lower shaft; and
   the gearing transmits a rotation of the first lower shaft to the second shaft in a predetermined rotation direction, and transmits the rotation of the first lower shaft to the third shaft in a direction opposite to the predetermined rotation direction.

18. A marine propulsion device comprising:
   a drive source;
   a first shaft connected to the drive source and extending in a first axial direction;
   a first gear connected to the first shaft;
   a second shaft extending in a second axial direction intersecting the first axial direction;
   a second gear that meshes with the first gear, is coaxial with the second shaft, and is rotatable with respect to the second shaft;
   a third gear that meshes with the first gear, is coaxial with the second shaft, is rotatable with respect to the second shaft, and faces the second gear in the second axial direction;
   a clutch that switches between engagement and disengagement of the second gear and the second shaft, and engagement and disengagement of the third gear and the second shaft;
   a case including an internal space where the first gear, the second gear, and the third gear are located; and
   a partition wall located between the second gear and the third gear in the internal space, and partitions the internal space into a first space where the second gear is located, and a second space where the third gear is located.

* * * * *